US011012345B2

(12) United States Patent
Tang (10) Patent No.: US 11,012,345 B2
(45) Date of Patent: May 18, 2021

(54) DATA TRANSMISSION METHOD, DEVICE, AND SYSTEM (71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/093,705

(22) PCT Filed: May 25, 2016

(86) PCT No.: PCT/CN2016/083324
§ 371 (c)(1),
(2) Date: Oct. 15, 2018

(87) PCT Pub. No.: WO2017/201689
PCT Pub. Date: Nov. 30, 2017

(65) Prior Publication Data
US 2019/0132238 A1 May 2, 2019

(51) Int. Cl.
*H04L 12/26* (2006.01)
*H04L 12/707* (2013.01)
(Continued)

(52) U.S. Cl.
CPC .............. *H04L 45/22* (2013.01); *H04L 1/00* (2013.01); *H04L 1/16* (2013.01); *H04L 1/1628* (2013.01);
(Continued)

(58) Field of Classification Search
CPC ...... H04L 45/32; H04L 47/11; H04L 43/0811; H04L 1/16; H04L 12/707
See application file for complete search history.

(56) References Cited

U.S. PATENT DOCUMENTS

2007/0124642 A1* 5/2007 Suh .................. H04L 1/1867
714/749
2008/0123579 A1* 5/2008 Kozat ................ H04L 1/1685
370/312
(Continued)

FOREIGN PATENT DOCUMENTS

CN   101568143 A   10/2009
CN   101827428 A   9/2010
(Continued)

OTHER PUBLICATIONS

Supplementary European Search Report in European application No. 16902679.6 dated Mar. 14, 2019.
(Continued)

*Primary Examiner* — Chi Ho A Lee (57) ABSTRACT

The present application provides a data transmission method, device and system. The method comprises: a sending device sends a data packet to a receiving device by means of a first relay device, and receives feedback information of the receiving device on the receiving condition of the data packet by means of another communication link according to a predetermined condition. Therefore, the sending device can timely obtain the feedback information of the receiving device on the receiving condition of the data packet by means of another communication link under a predetermined condition.

18 Claims, 5 Drawing Sheets

(51) Int. Cl.
    *H04L 1/00*     (2006.01)
    *H04L 1/16*     (2006.01)
    *H04L 12/801*     (2013.01)

(52) U.S. Cl.
    CPC ........ *H04L 1/1635* (2013.01); *H04L 43/0811* (2013.01); *H04L 47/11* (2013.01); *H04L 1/1685* (2013.01); *H04L 2001/0097* (2013.01)

(56) References Cited

U.S. PATENT DOCUMENTS

| | | | | |
|---|---|---|---|---|
| 2008/0317017 | A1* | 12/2008 | Wiemann | H04L 1/0002 370/389 |
| 2009/0216897 | A1* | 8/2009 | Wang | H04N 21/2343 709/231 |
| 2010/0054137 | A1 | 3/2010 | Deng | |
| 2010/0088568 | A1* | 4/2010 | Larsson | H04L 1/1607 714/751 |
| 2010/0097976 | A1* | 4/2010 | Agrawal | H04L 1/1819 370/315 |
| 2010/0246478 | A1* | 9/2010 | Liu | H04L 1/1887 370/315 |
| 2011/0007684 | A1* | 1/2011 | Liu | H04L 1/16 370/315 |
| 2011/0249619 | A1 | 10/2011 | Yu | |
| 2011/0249620 | A1 | 10/2011 | Yu | |
| 2011/0310789 | A1* | 12/2011 | Hu | H04L 5/0005 370/315 |
| 2012/0093068 | A1 | 4/2012 | Okuda | |
| 2012/0127888 | A1* | 5/2012 | Fujishima | H04W 72/085 370/252 |
| 2013/0064172 | A1* | 3/2013 | Park | H04W 72/0413 370/315 |
| 2014/0098721 | A1* | 4/2014 | Chen | H04W 72/005 370/280 |
| 2014/0241254 | A1* | 8/2014 | Kaur | H04L 1/1812 370/329 |
| 2015/0245338 | A1 | 8/2015 | Yu | |

FOREIGN PATENT DOCUMENTS

| | | |
|---|---|---|
| CN | 102845002 A | 12/2012 |
| CN | 102859911 A | 1/2013 |
| JP | 2006066948 A | 3/2006 |
| JP | 2008211803 A | 9/2008 |
| JP | 2009539299 A | 12/2009 |
| JP | 2013534120 A | 8/2013 |
| JP | 2014099770 A | 5/2014 |
| WO | 2011021246 A1 | 2/2011 |

OTHER PUBLICATIONS

English translation of the Written Opinion of the International Search Authority in the international application No. PCT/CN2016/083324, dated Jan. 5, 2017.
International Search Report in international application No. PCT/CN2016/083324, dated Jan. 5, 2017.
Written Opinion of the International Search Authority in international application No. PCT/CN2016/083324, dated Jan. 5, 2017.
First Office Action of the Japanese application No. 2018-555517, dated Feb. 4, 2020.
Notice of Rejection of the Japanese application No. 2018-555517, dated Jul. 28, 2020.
First Office Action of the Chinese application No. 201680084217.2, dated Aug. 31, 2020.
Office Action of the Indian application No. 201817045988, dated Sep. 23, 2020.

* cited by examiner

DATA TRANSMISSION METHOD, DEVICE, AND SYSTEM

TECHNICAL FIELD

The disclosure relates to the field of communications, and in particular to a data transmission method, a device and a system.

BACKGROUND

In existing Long Term Evolution (LTE) systems, a basic communication manner is a conventional cellular network-based communication manner, the specific form of which is described as follows. A terminal needs to establish a connection with a base station when communication is required and send data to the base station. Then after the base station interacts with a target terminal or a server through a core network, the data is sent to the target terminal or the server by a source terminal through the base station and the core network.

In LTE Release 12, a terminal direct connection technology was introduced, i.e., terminals may communicate directly by using resources allocated by a bases station. In LTE Release 13, a terminal relay technology based on the terminal direct connection technology was introduced into the terminal direction communication, i.e., the terminal may transmit data to a base station node through a terminal relay via a Sidelink (SL) interface and an interface (Uu: including DL and UL) between a generic terminal and the base station.

In future wireless communication systems, in addition to the conventional hand-held terminals, there will be increasingly various other types of terminals, including smart bracelets, wireless TVs, smart glasses, robots, watches and the like. When such smart terminals are connected with a network through a wireless relay device such as a mobile phone and the like, the similar existing terminal direct connection technology and terminal relay technology may be adopted.

However, when the generic terminal selects a wireless relay device, particularly a wireless relay device evolved by the generic terminal, due to factors such as mobility, amount of electricity, user selection and the like, link failures may occur on both an access link and a backhaul link.

The existing direct terminal-relay device methods specify to adopt signal quality of a wireless link to determine whether the relay device has relay capability. For example, when the signal quality of the backhaul link for the relay device is higher than a certain threshold (T1), the relay device has the relay capability and may perform relaying for other nodes. When the signal quality of the backhaul link for the relay device is lower than a certain threshold (T2), the relay device should stop performing relaying for other terminals. Further, when the base station determines that such relay device is no longer suitable to be a relay device, the base station may stop the relay device from continuing to relay data by releasing signaling, and the relay device may also notify the generic terminal through a corresponding signaling.

Further, the existing direct terminal-relay device may also identify a relay through high-level signaling that the relay is not allowed or available to assist a terminal node to send or receive data, such as Not Allowed or Not Available.

However, when there is a problem in the relay-related links, existing feedback approach is still performed in a hop-by-hop manner. For example, as for uplink, a base station feedbacks to a relay, and then the relay feedbacks to the terminal; and as for downlink, the terminal feeds back to the relay, and then the relay feeds back to the base station. In this case, the actual situation of the relay data transmission may be acquired in real time. For example, on the downlink, when a large amount of data arrive at the relay device while have not yet been sent to the terminal, if there occurs a problem in the backhaul link, the remaining data can only be discarded even if the remaining data can be sent by the relay device to the terminal successfully. This is because the relay device cannot confirm to the base station whether these data packets were sent successfully. On the uplink, in the similar situation, when a large amount of data from the terminal arrive at the relay device while have not yet been sent to the base station, if there occurs a problem in the access link, the remaining data can only be discarded even if the remaining data can be sent by the relay device to the base station successfully. This is because the relay device cannot confirm to the terminal whether these data packets were sent successfully.

SUMMARY

The disclosure aims to address one of the technical problems in the related art at least in a certain degree.

To this end, a first aspect of the disclosure is to provide a data transmission method, which may enable a sending device to timely acquire feedback information on successful reception or unsuccessful reception of a data packet from a receiving device via other communication links under a pre-configured condition.

A second aspect of the disclosure is to provide a data transmission method.

A third aspect of the disclosure is to provide a sending device.

A fourth aspect of the disclosure is to provide a receiving device.

A fifth aspect of the disclosure is to provide a data transmission system.

In order to achieve the above aspects, a first aspect of the disclosure provides a data transmission method, which may include the following operations. A sending device sends a data packet to a receiving device through a first relay device. The sending device receives feedback information on successful reception or unsuccessful reception of the data packet from the receiving device via other communication links according to the pre-configured condition.

According to the data transmission method provided by the embodiments of the disclosure, a sending device may send a data packet to a receiving device through a first relay device, and receive feedback information on successful reception or unsuccessful reception of the data packet from the receiving device via other communication links according to a pre-configured condition. Therefore, the sending device can timely acquire the feedback information on successful reception or unsuccessful reception of the data packet from the receiving device via the other communication links under the pre-configured condition.

In order to achieve the above aspects, a second aspect of the disclosure provides a data transmission method, which may include the following operations. A receiving device receives a data packet from a sending device through a first relay device. The receiving device sends feedback information on successful reception or unsuccessful reception of the data packet to the sending device via other communication links according to a pre-configured condition.

According to the data transmission method provided by the embodiments of the disclosure, a receiving device may receive the data packet from a sending device though a first relay device, and send feedback information on successful reception or unsuccessful reception of the data packet to the sending device via other communication links according to a pre-configured condition. Therefore, the receiving device can timely feed information on successful reception or unsuccessful reception of the data packet to the sending device via the other communication links under the pre-configured condition.

In order to achieve the above aspects, a third aspect of the disclosure provides a sending device, which may include a first sending module and a first receiving module. The first sending device may be configured to send a data packet to a receiving device through a first relay device. The first receiving module may be configured to receive feedback information on successful reception or unsuccessful reception of the data packet from the receiving device via other communication links according to a pre-configured condition.

The sending device provided by the embodiment of the disclosure may send a data packet to a receiving device through a first relay device, and receive feedback information on successful reception or unsuccessful reception of the data packet from the receiving device via other communication links according to a pre-configured condition. Therefore, the sending device can timely acquire the feedback information on successful reception or unsuccessful reception of the data packet from the receiving device via the other communication links under the pre-configured condition.

In order to achieve the above aspects, a fourth aspect of the disclosure provides a receiving device, which may include a second receiving module and a second sending module. The second receiving module may be configured to receive a data packet from a sending device through a first relay device. The second sending module may be configured to send feedback information on successful reception or unsuccessful reception of the data packet to the sending device via other communication links according to a pre-configured condition.

The receiving device provided by the embodiment of the disclosure may receive a data packet from a sending device though the first relay device, and send feedback information on successful reception or unsuccessful reception of the data packet to the sending device via other communication links according to a pre-configured condition. Therefore, the receiving device can timely feed information on successful reception or unsuccessful reception of the data packet to the sending device via the other communication links under the pre-configured condition.

In order to achieve the above aspects, a fifth aspect of the disclosure provides a data transmission system. The data transmission system may include the sending device as described above, the receiving device as described above, and the first relay device configured to send a data packet from the sending device to the receiving device.

According to the data transmission system provided by the embodiment of the disclosure, a sending device may send a data packet to a receiving device through a first relay device, and receive feedback information on successful reception or unsuccessful reception of the data packet from the receiving device via other communication links according to a pre-configured condition. Therefore, the sending device can timely acquire the feedback information on successful reception or unsuccessful reception of the data packet from the receiving device via the other communication links under the pre-configured condition.

DETAILED DESCRIPTION

Embodiments of the disclosure will be described in detail below and examples of the embodiments are illustrated in the accompanying drawings, wherein the same or similar reference numerals refer to the same or similar elements or elements having the same or similar functions throughout the disclosure. The following embodiments described in detail with reference to the accompanying drawings are exemplary, which are intended to explain the disclosure but not be taken to limit the disclosure.

The data transmission method, device and system of embodiments of the disclosure will be described below with reference to the accompanying drawings.

Figure 1:
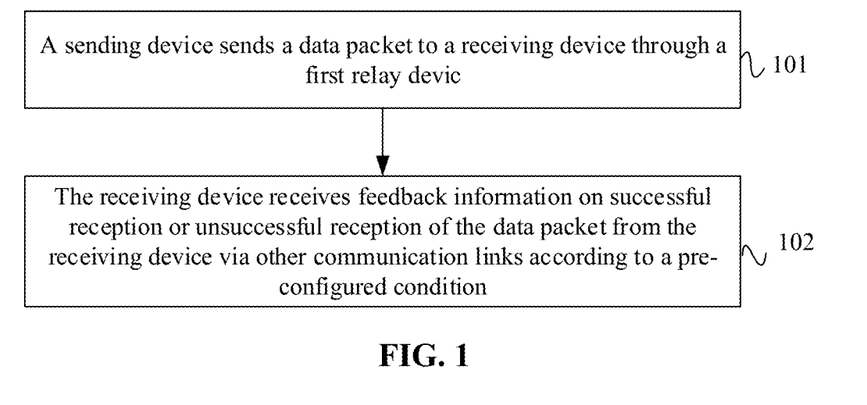
FIG. 1 is a flowchart of a data transmission method according to an embodiment of the disclosure.

FIG. 1 is a flowchart of a data transmission method according to an embodiment of the disclosure.

With reference to FIG. 1, the data transmission method includes the following operations.

In 101, a sending device sends a data packet to a receiving device through a first relay device.

In 102, the sending device receives feedback information on successful reception or unsuccessful reception of the data packet from the receiving device via other communication links according to a pre-configured condition.

Specifically, during the procedure that the sending device transmits the data packet to the receiving device through the first relay device, it is detected whether a transmission procedure satisfies the pre-configured condition. When the transmission procedure satisfies the pre-configured condition, the sending device may acquire the feedback information on successful reception or unsuccessful reception of the data packet from the receiving device via the other communication links.

It should be noted that different conditions may be set according to practical application requirements. For example, a relay link between the sending device and the first relay device fails, or the relay link between the sending device and the first relay device congests. Exemplary illustration is given as follows.

It is assumed that the pre-configured condition includes that the relay link between the sending device and the first relay device fails. That is to say, when it is detected that the relay link between the sending device and the first relay device fails, it is determined that the sending device cannot transmit data to the receiving device through the first relay device.

Therefore, the sending device may receive the feedback information on successful reception or unsuccessful reception of the data packet from the receiving device via the other communication links.

It is to be noted that the above pre-configured condition is only an example, and other conditions may be set according to practical application scenarios, so that the sending device may timely acquire information on successful reception or unsuccessful reception of the data packet from the receiving device via the other communication links.

It is to be noted that the sending device may receive the feedback information on successful reception or unsuccessful reception of the data packet from the receiving device via different other communication links according to a specific application scenario. Exemplary illustration is given as follows.

As an example, the sending device may receive the feedback information on successful reception or unsuccessful reception of the data packet from the receiving device via a direct link with the receiving device.

As another example, the sending device may receive the feedback information on successful reception or unsuccessful reception of the data packet from the receiving device through a second relay device.

According to the data transmission method provided by the embodiments of the disclosure, a sending device sends a data packet to a receiving device through a first relay device, and receives feedback information on successful reception or unsuccessful reception of the data packet from the receiving device via other communication links according to a pre-configured condition. In this way, the sending device can timely acquire the feedback information on successful reception or unsuccessful reception of the data packet from the receiving device under a pre-configured condition, thereby performing corresponding operations according to the feedback information.

Further, based on the above embodiment, the receiving device may send the feedback information on successful reception or unsuccessful reception of the data packet to the sending device through various triggering modes according to the application scenarios. Exemplary illustration is given as follows.

As an example, the feedback information on successful reception or unsuccessful reception of the data packet from the receiving device may be fed back to the sending device by the receiving device according to a query request sent from the sending device.

As another example, the feedback information on successful reception or unsuccessful reception of the data packet from the receiving device may be periodically fed back to the sending device by the receiving device according to a pre-configured cycle.

As another example, the feedback information on successful reception or unsuccessful reception of the data packet from the receiving device may be actively fed back to the sending device by the receiving device according to the pre-configured condition.

Further, the feedback information on successful reception or unsuccessful reception of the data packet from the receiving device may be carried in multiple signalings to be sent to the sending device according to the application requirements. Exemplary illustration is given as follows.

As an example, the feedback information on successful reception or unsuccessful reception of the data packet from the receiving device may be carried in a Radio Resource Control (RRC) signaling. In the example, the feedback information may include logical channel information and information on reception of data.

As another example, the feedback information on successful reception or unsuccessful reception of the data packet from the receiving device may be carried in a Medium Access Control (MAC) Control Element (CE) of a corresponding logical channel data.

As another example, the feedback information on successful reception or unsuccessful reception of the data packet from the receiving device may be carried in a control sequence of a Radio Link Control (RLC) for the corresponding logical channel data.

As another example, the feedback information on successful reception or unsuccessful reception of the data packet from the receiving device may be carried in relevant state information of a Packet Data Convergence Protocol (PDCP) SN for the corresponding logic channel data.

Further, when the feedback information on successful reception or unsuccessful reception of the data packet from the receiving device is carried in one of MAC, RLC or PDCP, a corresponding transmission path may be identified in a control field of a corresponding layer.

Based on the above embodiments, the data transmission method provided by the embodiments of the disclosure may further include the following operations.

The sending device may send remaining data packets to the receiving device via other communication links according to the feedback information on successful reception or unsuccessful reception of the data packet from the receiving device.

Specifically, according to the feedback information on successful reception or unsuccessful reception of the data packet from the receiving device, the sending device may acquire the data packets successfully received by the receiving device. Then, the sending device may determine the remaining data packets to be sent and send the remaining data packets to the receiving device via the other communication links.

It is to be noted that the sending device may send the remaining data packets to the receiving device via different other communication links according to specific application scenarios. Exemplary illustration is given as follows.

As an example, the sending device may send the remaining data packets to the receiving device via a direct link with the receiving device.

As another example, the sending device may send the remaining data packets to the receiving device through a second relay device.

According to the data transmission method provided by the embodiments of the disclosure, a sending device sends a data packet to a receiving device through a first relay device. The sending device receives feedback information on successful reception or unsuccessful reception of the data packet from the receiving device via other communication links according to a pre-configured condition, and sends the remaining data packets to the receiving device via the other communication links according to the feedback information. Therefore, the sending device can timely acquire the feedback information on successful reception or unsuccessful reception of the data packet from the receiving device under the pre-configured condition, thereby performing corresponding transmission and processing on the remaining data packets according to the feedback information, improving efficiency of data transmission and avoiding waste of resources.

Figure 2:
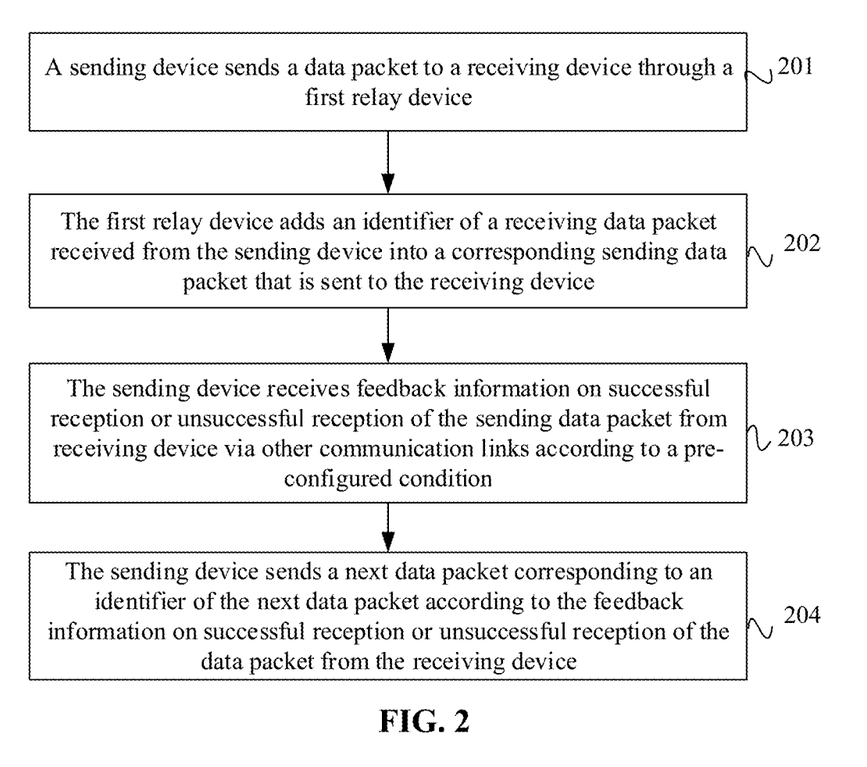
FIG. 2 is a flowchart of a data transmission method according to another embodiment of the disclosure.

FIG. 2 is a flowchart of a data transmission method according to another embodiment of the disclosure.

With reference to FIG. 2, the operation in 101 of the embodiment illustrated in FIG. 1 may include the following actions.

In 201, a sending device sends a data packet to a receiving device through a first relay device.

In 202, the first relay device adds an identifier of a receiving data packet received from the sending device into a corresponding sending data packet that is sent to the receiving device.

Specifically, during the procedure that the sending device transmits the data packet to the receiving device through the first relay device, the first relay device may add the identifier of the receiving data packet received from the sending device into the corresponding sending data packet that is sent to the receiving device. Herein, there are multiple modes for adding the identifier into the sending data packet. Exemplary illustration is given as follows.

As an example, a sequence number (SN) of the receiving data packet may be reused as an identifier of the sending data packet.

As another example, SNs of all the receiving data packets covered in the sending data packet may be added into the sending data packet.

Specifically, the first relay device may adopt a suitable mode to add the identifier into the sending data packet based on contents of the receiving data packet and the sending data packet. Exemplary illustration is given as follows.

Figure 3:
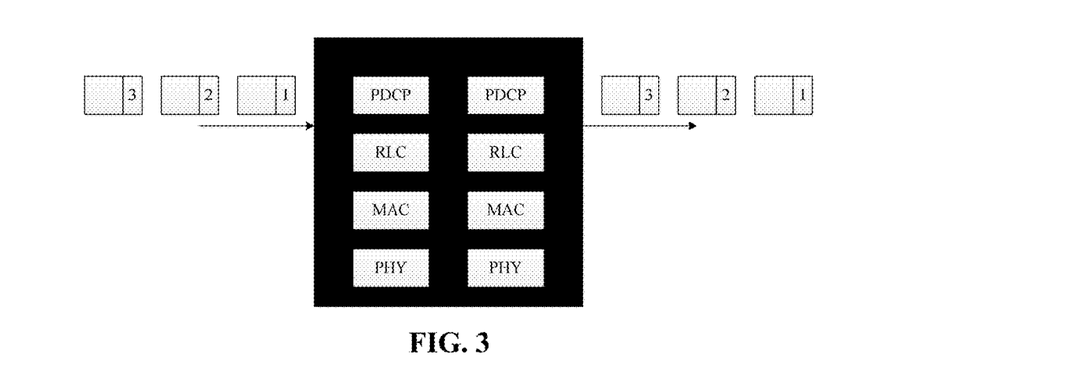
FIG. 3 is a first schematic diagram of receiving and sending data packets by a first relay device.

As an example, when the receiving data packet obtained by the first relay device from the sending device is the same as the sending data packet to be sent to the receiving device, the identifier of the receiving data packet may be reused as the identifier of the sending data packet. A new identifier may also be adopted to identify the sending data packet. For example, with reference to FIG. 3, the first relay device acquires a receiving data packet 1, a receiving data packet 2 and a receiving data packet 3 from the sending device, and reuses the identifiers of the receiving data packets as the identifier of the sending data packets, i.e., a sending data packet 1, a sending data packet 2 and a sending data packet 3. Additionally, the new identifier may also be adopted to identify the sending data packets, i.e., a sending data packet 4, a sending data packet 5, a sending data packet 6 (not shown) at a sending side.

Figure 4:
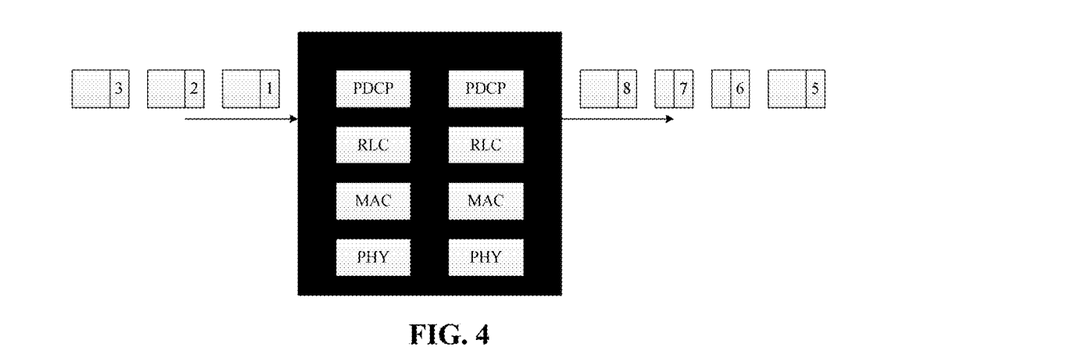
FIG. 4 is a second schematic diagram of receiving and sending data packets by a first relay device.

As another example, when transformation operations such as cascade and splitting are re-performed on the receiving data packet by the first relay device to generate the sending data packet, identifiers of all the receiving data packets covered in the sending data packet are added into the sending data packet. For example, with reference to FIG. 4, when splitting of data packets is performed, the data packet 2 is split, and a new identifier is adopted for identifying at the sending side. For example, an identifier 5 is used to identify the receiving data packet 1, an identifier 6 is used to identify a first portion of the receiving data packet 2, an identifier 7 is used to identify a second portion of the receiving data packet, and an identifier 8 is used to identify the receiving data packet 3.

Figure 5:
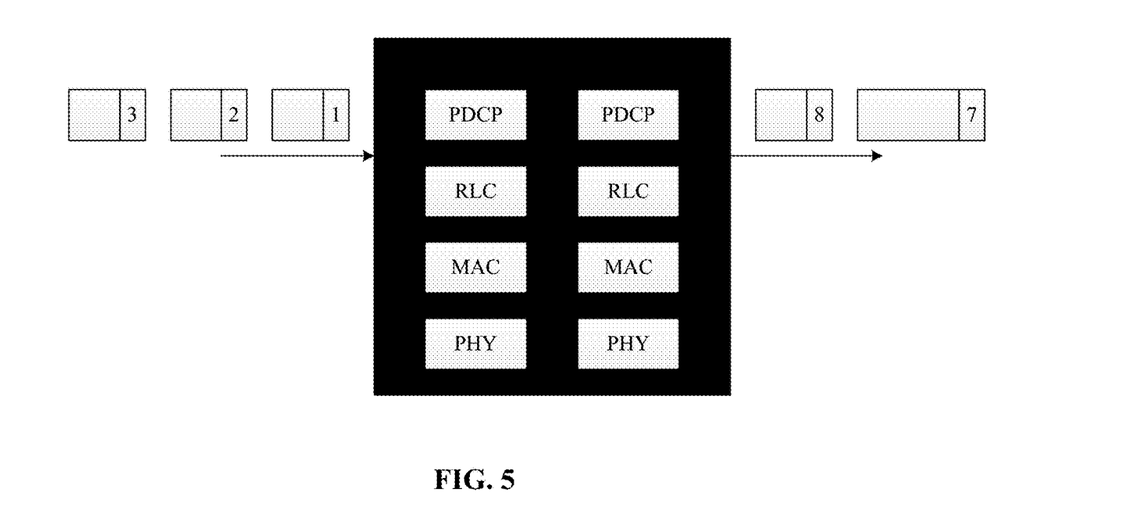
FIG. 5 is a third schematic diagram of receiving and sending data packets by a first relay device.

With reference to FIG. 5, when cascade of data packets is performed and the data packet 1 and the data packet 2 are cascaded, a new identifier is adopted for identifying. For example, an identifier 7 is used to identify a cascaded packet of the data packet 1 and the data packet 2, and an identifier 8 is used to identify the data packet 3.

It is to be noted that the above is only examples for illustrating how to add the identifiers into the sending data packet, and other suitable modes may be adopted according to requirements.

In 203, the sending device receives feedback information on successful reception or unsuccessful reception of the sending data packet from the receiving device via other communication links according to a pre-configured condition.

Specifically, when the pre-configured condition is satisfied, such as a relay link between the sending device and the receiving device fails, the sending device may acquire the feedback information on successful reception or unsuccessful reception of the data packet sent by the first relay device from the receiving device via the other communication links.

In 204, the sending device sends a next data packet corresponding to an identifier of the next data packet according to the feedback information on successful reception or unsuccessful reception of the data packet from the receiving device.

According to the data transmission method provided by the embodiments of the disclosure, a sending device sends a data packet to a receiving device through a first relay device, and a first relay device adds an identifier of a receiving data packet received from a sending data packet into a corresponding sending data packet sent to the receiving device. The sending device receives the feedback information on successful reception or unsuccessful reception of the data packet from the receiving device via other communication links according to the pre-configured condition, and sends a next data packet corresponding to the identifier of the next data packet according to the feedback information. Therefore, the sending device can timely acquire the feedback information on successful reception or unsuccessful reception of the data packet from the receiving device under the pre-configured condition, thereby performing corresponding transmission and processing on the remaining data packets according to the feedback information, improving efficiency of data transmission and avoiding waste of resources.

In order to illustrate the above data transmission process more clearly, in combination with FIG. 6 and FIG. 7, the illustration is given below with communication interaction between a base station and a terminal through a first relay device as an example.

Figure 6:
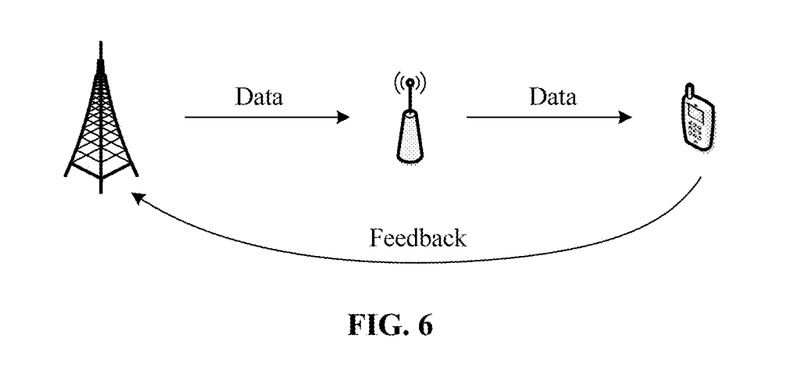
FIG. 6 is a first schematic diagram that a base station communicates with a terminal through a first relay device.

With reference to FIG. 6, when a backhaul link between the base station and the first relay device fails, during downlink data transmission, information on successful reception or unsuccessful reception of data is fed back by the terminal to the base station. During uplink data transmission, information on successful reception or unsuccessful reception of data is fed back by the base station or by the first relay device to the base station.

Figure 7:
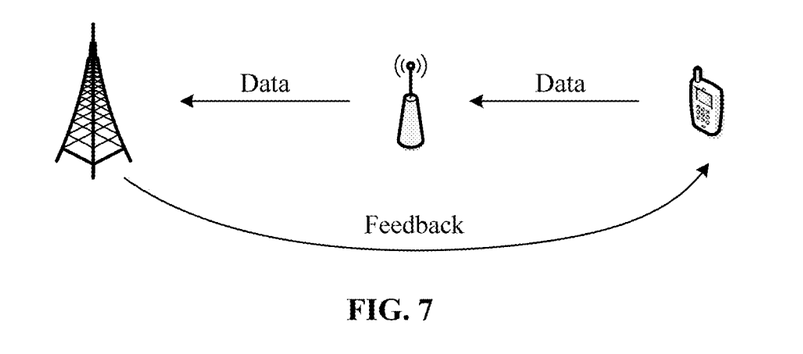
FIG. 7 is a second schematic diagram that a base station communicates with a terminal through a first relay device.

In an alternative example, with reference to FIG. 7, when an access link between the terminal and the first relay device fails, during the downlink data transmission, information on successful reception or unsuccessful reception of data is fed back by the terminal or by the first relay device to the base station. During the uplink data transmission, the sending device is the terminal, the receiving device is the base station, and information on successful reception or unsuccessful reception of data is fed back by the base station to the terminal.

Figure 8:
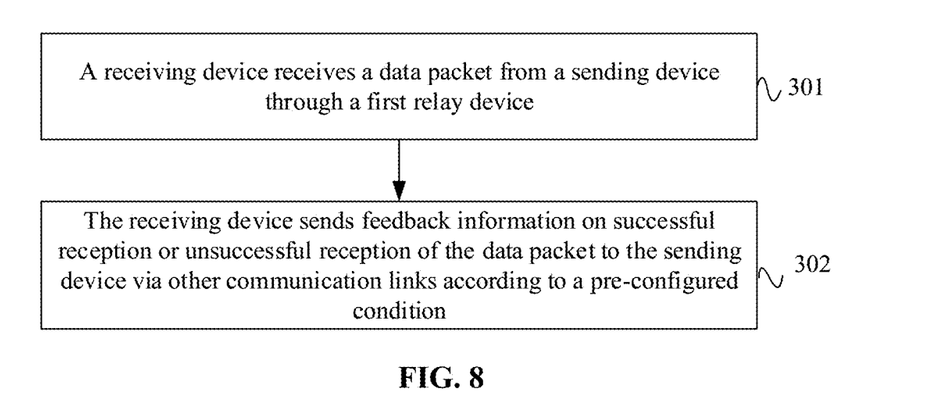
FIG. 8 is a flowchart of a data transmission method according to another embodiment of the disclosure.

FIG. 8 is a flowchart of a data transmission method according to another embodiment of the disclosure.

With reference to FIG. 8, the data transmission method may include the following operations.

In 301, a receiving device receives a data packet from a sending device through a first relay device.

In 302, the receiving device sends feedback information on successful reception or unsuccessful reception of the data packet to the sending device via other communication links according to a pre-configured condition.

Specifically, the sending device may send the feedback information on successful reception or unsuccessful reception of the data packet to the sending device in various ways. Exemplary illustration is given as follows.

As an example, the receiving device may send the feedback information on successful reception or unsuccessful reception of the data packet to the sending device via the other communication links according to a query request from the sending device.

As an alternative example, the receiving device may periodically send the feedback information on successful reception or unsuccessful reception of the data packet to the sending device via the other communication links according to a pre-configured cycle.

As an alternative example, the receiving device may actively perform periodical transmission of the feedback information on successful reception or unsuccessful reception of the data packet to the sending device via the other communication links according to the pre-configured condition.

Herein, the operation that the receiving device sends feedback information on successful reception or unsuccessful reception of the data packet to the sending device via other communication links may include the following actions.

As an example, the receiving device may send the feedback information on successful reception or unsuccessful reception of the data packet to the sending device via a direct link with the sending device.

As an alternative example, the receiving device may send the feedback information on successful reception or unsuccessful reception of the data packet to the sending device through a second relay device.

Further, based on the embodiment illustrated in FIG. 8, the data transmission method may further include the following operations.

The receiving device may receive remaining data packets from the sending device via the other communication links.

Herein, the operation that the receiving device sends feedback information on successful reception or unsuccessful reception of the data packet to the sending device via other communication links may include the following actions.

As an example, the receiving device may send the feedback information on successful reception or unsuccessful reception of the data packet to the sending device via a direct link with the sending device.

As an alternative example, the receiving device may send the feedback information on successful reception or unsuccessful reception of the data packet to the sending device through a second relay device.

The above embodiment is an implementation process at the receiving device side and is a peer-to-peer interaction with the sending device. The specific implementation process of the embodiment is similar to that at the sending device side, and the technical principle and technical effects refer to the implementation process as described above, which will not be elaborated herein.

In order to implement the above embodiment, the disclosure further provides a sending device.

Figure 9:
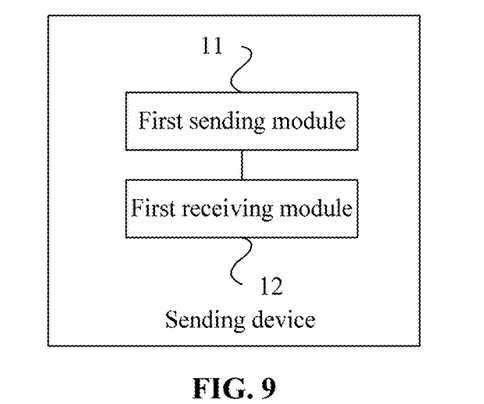
FIG. 9 is a block diagram of a sending device according to an embodiment of the disclosure.

FIG. 9 is a block diagram of a sending device according to an embodiment of the disclosure.

As illustrated in FIG. 9, the sending device may include a first sending module 11 and a first receiving module 12.

The first sending module 11 is configured to send a data packet to a receiving device through a first relay device.

The first receiving module 12 is configured to receive feedback information on successful reception or unsuccessful reception of the data packet from the receiving device via other communication links according to a pre-configured condition.

Herein, the pre-configured condition includes the following manners.

As an example, a link between the sending device and the first relay device fails.

As another example, the link between the sending device and the first relay device congests.

In another example, the first sending module 11 may further be configured to send remaining data packets to the receiving device via the other communication links according to the feedback information.

Further, in another example, the first relay device may add an identifier of a receiving data packet received from the sending device into a corresponding sending data packet that is sent to the receiving device.

Herein, the operation of adding an identifier into the corresponding sending data packet may include the following actions.

As an example, a sequence number (SN) of the receiving data packet may be reused as an identifier of the sending data packet.

As another example, SNs of all receiving data packets covered in the sending data packet may be added into the sending data packet.

Specifically, as an example, when the receiving data packet is the same as the sending data packet, the SN of the receiving data packet is reused as the identifier of the sending data packet.

As an example, when the receiving data packet is restructured by the first relay device to generate the sending data packet, SNs of all the receiving data packets covered in the sending data packet are added into the sending data packet.

Further, the first receiving module 12 may be configured to receive the feedback information on successful reception or unsuccessful reception of the data packet from the receiving device via a direct link with the receiving device, or receive the feedback information on successful reception or unsuccessful reception of the data packet via a second relay device.

As an example, the feedback information may at least include SNs of all the data packets that are received successfully by the receiving device on a link between the sending device and the first relay device.

As another example, the feedback information may at least includes a maximum SN value among continuous sequence numbers of all the data packets that are received successfully by the receiving device on the link between the sending device and the first relay device.

Further, in another example, the feedback information on successful reception or unsuccessful reception of the data packet from the receiving device may be fed back to the sending device by the receiving device according to a query request from the sending device.

In another example, the feedback information on successful reception or unsuccessful reception of the data packet from the receiving device may be periodically fed back to the sending device by the receiving device according to a pre-configured cycle.

In another example, the feedback information on successful reception or unsuccessful reception of the data packet from the receiving device may be actively fed back to the sending device by the receiving device according to the pre-configured condition.

Further, as an example, the feedback information on successful reception or unsuccessful reception of the data packet from the receiving device may be carried in a Radio Resource Control (RRC) signaling. In the example, the feedback information may include logical channel information and information on data reception.

As an alternative example, the feedback information on successful reception or unsuccessful reception of the data packet from the receiving device may be carried in a Medium Access Control (MAC) Control Element (CE) of a corresponding logical channel data.

As an alternative example, the feedback information on successful reception or unsuccessful reception of the data packet from the receiving device may be carried in a control sequence of a Radio Link Control (RLC) Sequence Number (SN) for the corresponding logical channel data.

As an alternative example, the feedback information on successful reception or unsuccessful reception of the data packet from the receiving device may be carried in relevant state information of a Packet Data Convergence Protocol (PDCP) SN for the corresponding logic channel data.

Further, in another example, when the feedback information on successful reception or unsuccessful reception of the data packet from the receiving device may be carried in one of MAC, RLC or PDCP, a corresponding transmission path may be identified in a control field of a corresponding layer.

Further, in another example, the first sending module 11 may be configured to perform the following operations.

As an example, the first sending module may send the remaining data packets to the receiving device via the direct link with the receiving device.

As another example, the first sending module may send the remaining data packets to the receiving device through the second relay device.

Further, in another example, the first sending module 11 may be configured to send a next data packet corresponding to an identifier of the next data packet according to the feedback information on successful reception or unsuccessful reception of the data packet from the receiving device.

It is to be noted that the above illustrations to the embodiments of the data transmission method are also applied for the sending device of this embodiment, the implementation principle and technical effects of which are similar. This will not be elaborated herein.

In order to implement the above embodiments, the disclosure further provides a receiving device.

Figure 10:
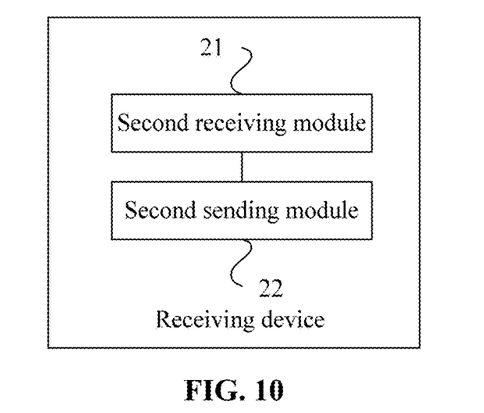
FIG. 10 is a block diagram of a receiving device according to an embodiment of the disclosure.

FIG. 10 is a block diagram of a receiving device according to an embodiment of the disclosure.

As illustrated in FIG. 10, the receiving device includes a second receiving module 21 and a second sending module 22.

The second receiving module 21 is configured to receive a data packet from a sending device through a first relay device.

The second sending module 22 is configured to send feedback information on successful reception or unsuccessful reception of the data packet to the sending device via other communication links according to a pre-configured condition.

Further, in another example, the first sending module 21 may be configured to receive remaining data packets from the sending device via the other communication links.

Further, the second sending module 22 may be configured to perform the following operations.

As an example, the second sending module may send the feedback information on successful reception or unsuccessful reception of the data packet to the sending device via the other communication links according to a query request from the sending device.

As an alternative example, the second sending module may periodically send the feedback information on successful reception or unsuccessful reception of the data packet to the sending device via the other communication links according to a pre-configured cycle.

As an alternative example, the second sending module may actively perform periodical transmission of the feedback information on successful reception or unsuccessful reception of the data packet to the sending device via the other communication links according to the pre-configured condition.

Further, the second sending module 22 may be configured to perform the following operations.

As an example, the second sending module may send the feedback information on successful reception or unsuccessful reception of the data packet to the sending device via a direct link with the sending device, As an alternative example, the second sending module may send the feedback information on successful reception or unsuccessful reception of the data packet to the sending device through a second relay device.

Further, the second receiving module 21 may be configured to perform the following operations.

As an example, the second receiving module may receive the remaining data packets from the sending device via the direct link with the sending device.

As an alternative example, the second receiving module may receive the remaining data packet from the sending device through the second relay device.

It is to be noted that the above illustrations to the embodiments of the data transmission method are also applied for the receiving device of this embodiment, the implementation principle and technical effects of which are similar. This will not be elaborated herein.

In order to implement the above embodiments, the disclosure further provides a data transmission system.

Figure 11:
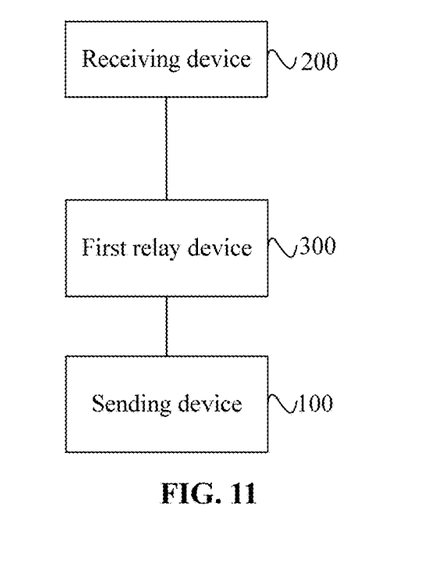
FIG. 11 is a block diagram of a data transmission system according to an embodiment of the disclosure.

FIG. 11 is a block diagram of a data transmission system according to an embodiment of the disclosure.

As illustrated in FIG. II, the data transmission system includes a sending device 100, a receiving device 200, and a first relay device 300 configured to send a data packet from the sending device 100 to the receiving device 200. The sending device 100 and the receiving device 200 may adopt the sending device and the receiving device provided by the above embodiments of the disclosure, and the first relay device 300 may adopt the first relay device in the above embodiments of the disclosure.

Figure 12:
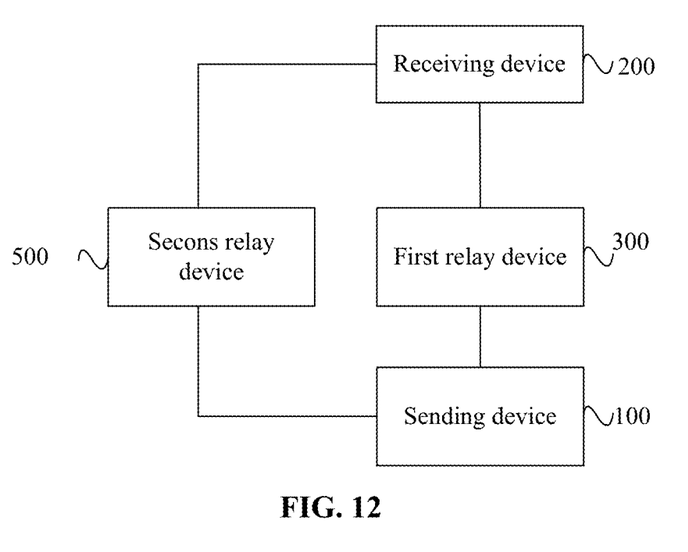
FIG. 12 is a block diagram of a data transmission system according to another embodiment of the disclosure.

FIG. 12 is a block diagram of a data transmission system according to an embodiment of the disclosure.

Based on FIG. 11, as illustrated in FIG. 12, the data transmission system may further include a second relay device 500 configured to send a data packet from the sending device 100 to the receiving device 200, wherein the second relay device 500 may adopt the second relay device in the above embodiments of the disclosure.

It is to be noted that the above illustrations to the embodiments of the data transmission method are also applied for the data transmission system of this embodiment, the implementation principle and technical effects of which are similar and will not be elaborated herein.

In descriptions of this specification, terms such as "an embodiment", "some embodiments", "exemplary embodiment(s)", "specific example(s)" or "some examples" are intended to indicate that specific features, structures, materials and characteristics described in combination with the embodiment or example are included within at least one embodiment or example of the disclosure. In the specification, the schematic description for the abovementioned terms is not necessary for the same embodiment or example. Further, the described features, structures, or characteristics may be combined in any one or more embodiments or examples in a suitable manner. Additionally, those skilled in the art may joint and combine various embodiments or examples described in this description and features thereof without conflict.

Additionally, the terms "first", "second" are only for description and not intended to indicate or imply relative importance or significance, or implicitly the number of the indicated technical features. Therefore, features defined with "first". "second" may implicitly or explicitly include at least one such feature. In description of the disclosure, the term "more" refers to at least two, for example two, three and the like unless clearly and specifically defined otherwise.

The invention claimed is:

1. A data transmission method, comprising:
   sending, by a sending device, a data packet to a receiving device through a first relay device;
   receiving, by the sending device, feedback information on successful reception or unsuccessful reception of the data packet from the receiving device via other communication links according to a pre-configured condition,
   wherein sending, by the sending device, the data packet to the receiving device through the first relay device comprises:
   adding, by the first relay device, an identifier of a receiving data packet received from the sending device into a corresponding sending data packet to be sent to the receiving device,
   wherein adding the identifier into the sending data packet comprises:
   reusing, when the receiving data packet is the same as the sending data packet, a sequence number (SN) of the receiving data packet as an identifier of the sending data packet; or
   adding, when the receiving data packet is re-structured by the first relay device to generate the sending data packet, SNs of all receiving data packets covered in the sending data packet into the sending data packet
   wherein the pre-configured condition comprises:
   a relay link between the sending device and the first relay device fails; or
   the relay link between the sending device and the first relay device congests.

2. The method of claim 1, wherein the pre-configured condition comprises:
   a relay link between the sending device and the first relay device fails; or
   the relay link between the sending device and the first relay device congests.

3. The method of claim 1, further comprising:
   sending, by the sending device, the remaining data packets to the receiving device via the direct link with the receiving device; or
   sending, by the sending device, the remaining data packets to the receiving device through the second relay device.

4. The method of claim 1, wherein receiving the feedback information on successful reception or unsuccessful reception of the data packet from the receiving device via the other communication links comprises:
   receiving, by the sending device, the feedback information on successful reception or unsuccessful reception of the data packet from the receiving device via a direct link with the receiving device; or
   receiving, by the sending device, the feedback information on successful reception or unsuccessful reception of the data packet from the receiving device via a second relay device.

5. The method of claim 1, wherein the feedback information at least comprises SNs of all data packets used on a link between the sending device and the first relay device, wherein all the data packets are received successfully by the receiving device; or
   the feedback information at least comprises a maximum SN value among continuous sequence numbers of all the data packets used on the link between the sending device and the first relay device, wherein all the data packets are received successfully by the receiving device.

6. The method of claim 1, wherein the feedback information on successful reception or unsuccessful reception of the data packet from the receiving device comprises one of the following:
   the feedback information on successful reception or unsuccessful reception of the data packet from the receiving device is fed back to the sending device by the receiving device according to a request from the sending device;
   the feedback information on successful reception or unsuccessful reception of the data packet from the receiving device is periodically fed back to the sending device by the receiving device according to a pre-configured cycle; or
   the feedback information on successful reception or unsuccessful reception of the data packet from the receiving device is fed back to the sending device by the receiving device according to the pre-configured condition.

7. The method of claim 1, wherein
   the feedback information on successful reception or unsuccessful reception of the data packet from the receiving device is carried in a Radio Resource Control (RRC) signaling, wherein the feedback information comprises logical channel information and information on reception of data; or
   the feedback information on successful reception or unsuccessful reception of the data packet from the receiving device is carried in a Medium Access Control (MAC) Control Element (CE) of a corresponding logical channel data; or
   the feedback information on successful reception or unsuccessful reception of the data packet from the receiving device is carried in a control sequence of a Radio Link Control (RLC) for the corresponding logical channel data; or, the feedback information on successful reception or unsuccessful reception of the data packet from the receiving device is carried in relevant state information of a Packet Data Convergence Protocol (PDCP) SN for the corresponding logic channel data.

8. The method of claim 1, wherein when the feedback information on successful reception or unsuccessful reception of the data packet from the receiving device is carried in one of MAC, RLC or PDCP, a corresponding transmission path is identified in a control field of a corresponding layer.

9. The method of claim 1, further comprising:
sending, by the sending device, a next data packet corresponding to an identifier of the next data packet according to the feedback information on successful reception or unsuccessful reception of the data packet from the receiving device.

10. A sending device, comprising: a memory and a processor, the memory storing one or more computer programs that, when executed by the processor, cause the processor to execute operations comprising:
sending a data packet to a receiving device through a first relay device;
receiving feedback information on successful reception or unsuccessful reception of the data packet from the receiving device via other communication links according to a pre-configured condition,
wherein an identifier of a receiving data packet received from the sending device is added by the first relay device into a corresponding sending data packet to be sent to the receiving device,
wherein the operation that the identifier is added into the corresponding sending data packet comprises:
reusing, when the receiving data packet is the same as the sending data packet, a sequence number (SN) of the receiving data packet as an identifier of the sending data packet; or
adding, when the receiving data packet is re-structured by the first relay device to generate the sending data packet, SNs of all receiving data packets covered in the sending data packet into the sending data packet
wherein the pre-configured condition comprises:
a relay link between the sending device and the first relay device fails; or
the relay link between the sending device and the first relay device congests.

11. The device of claim 10, wherein the pre-configured condition comprises:
a relay link between the sending device and the first relay device fails; or
the relay link between the sending device and the first relay device congests.

12. The device of claim 10, wherein the operations further comprise:
receiving the feedback information on successful reception or unsuccessful reception of the data packet from the receiving device via a direct link with the receiving device; or
receiving the feedback information on successful reception or unsuccessful reception of the data packet from the receiving device via a second relay device.

13. The device of claim 10, wherein the feedback information on successful reception or unsuccessful reception of the data packet from the receiving device comprises one of the following:
the feedback information on successful reception or unsuccessful reception of the data packet from the receiving device is fed back to the sending device by the receiving device according to a request from the sending device;
the feedback information on successful reception or unsuccessful reception of the data packet from the receiving device is periodically fed back to the sending device by the receiving device according to a pre-configured cycle; or
the feedback information on successful reception or unsuccessful reception of the data packet from the receiving device is fed back to the sending device by the receiving device according to the pre-configured condition.

14. The device of claim 10, wherein the operations further comprise:
sending the remaining data packets to the receiving device via the direct link with the receiving device; or
sending the remaining data packets to the receiving device through the second relay device.

15. The device of claim 10, wherein the feedback information at least comprises SNs of all data packets used on a link between the sending device and the first relay device, wherein all the data packets are received successfully by the receiving device; or
the feedback information at least comprises a maximum SN value among continuous sequence numbers of all the data packets used on the link between the sending device and the first relay device, wherein all the data packets are received successfully by the receiving device.

16. The device of claim 10, wherein
the feedback information on successful reception or unsuccessful reception of the data packet from the receiving device is carried in a Radio Resource Control (RRC) signaling, wherein the feedback information comprises logical channel information and information on reception of data; or
the feedback information on successful reception or unsuccessful reception of the data packet from the receiving device is carried in a Medium Access Control (MAC) Control Element (CE) of a corresponding logical channel data; or
the feedback information on successful reception or unsuccessful reception of the data packet from the receiving device is carried in a control sequence of a Radio Link Control (RLC) for the corresponding logical channel data; or,
the feedback information on successful reception or unsuccessful reception of the data packet from the receiving device is carried in relevant state information of a Packet Data Convergence Protocol (PDCP) SN for the corresponding logic channel data.

17. The device of claim 10, wherein when the feedback information on successful reception or unsuccessful reception of the data packet from the receiving device is carried in one of MAC, RLC or PDCP, a corresponding transmission path is identified in a control field of a corresponding layer.

18. The device of claim 10, wherein the operations further comprise:
sending a next data packet corresponding to an identifier of the next data packet according to the feedback information on successful reception or unsuccessful reception of the data packet from the receiving device.

* * * * *